(12) United States Patent
Murakami

(10) Patent No.: US 11,476,752 B2
(45) Date of Patent: Oct. 18, 2022

(54) POWER SUPPLY APPARATUS

(71) Applicant: Rohm Co., Ltd., Kyoto (JP)

(72) Inventor: Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 43 days.

(21) Appl. No.: 17/239,863

(22) Filed: Apr. 26, 2021

(65) Prior Publication Data

US 2021/0336531 A1  Oct. 28, 2021

(30) Foreign Application Priority Data

Apr. 28, 2020 (JP) ............................... JP2020079483

(51) Int. Cl.
*H02M 1/32* (2007.01)
*H02M 3/158* (2006.01)
*H02M 1/14* (2006.01)

(52) U.S. Cl.
CPC ............... *H02M 1/32* (2013.01); *H02M 1/14* (2013.01); *H02M 3/158* (2013.01)

(58) Field of Classification Search
CPC ........... H02M 1/32; H02M 1/14; H02M 3/158
See application file for complete search history.

(56) References Cited

U.S. PATENT DOCUMENTS 7,692,631 B2 * 4/2010 Inokuchi ............... G01L 1/2256
   345/161
7,919,954 B1 * 4/2011 Mannama ............... G05F 1/565
   323/272
9,753,473 B2 * 9/2017 Tan ........................ G05F 1/575
2007/0139385 A1 * 6/2007 Inokuchi ............... G06F 3/0338
   345/173
2008/0287079 A1 * 11/2008 Matsui .................. H04W 52/52
   455/127.1

(Continued)

FOREIGN PATENT DOCUMENTS

CN        102308462        1/2012
CN        10274213 5       10/2012

(Continued)

OTHER PUBLICATIONS

CN Office Action in Chinese Appln. No. 202110404918.2, dated May 27, 2022, 10 pages (with English Translation).

*Primary Examiner* — Rafael O De Leon Domenech
(74) *Attorney, Agent, or Firm* — Fish & Richardson P.C.

(57) ABSTRACT

The present disclosure provides a power supply apparatus, which provides an output voltage outputted by a DC/DC power circuit to a power supply system of a load and includes: an external terminal which a load-side ground potential is applied to; an adding portion configured for adding the load-side ground potential applied to the external terminal to a set reference voltage; a low-pass filter (LPF) including at least one resistor and at least one capacitor, wherein the LPF inputs an LPF input voltage based on an adding result of the adding portion; and an error amplifier, wherein the error amplifier is inputted an LPF output voltage from the LPF as a reference voltage and inputted a feedback voltage based on the LPF output voltage. The error amplifier is included in the DC/DC power circuit. The output voltage is controlled according to an output of the error amplifier.

10 Claims, 6 Drawing Sheets

(56) References Cited

U.S. PATENT DOCUMENTS

| | | | |
|---|---|---|---|
| 2009/0212753 A1* | 8/2009 | Lou | G05F 1/563 |
| | | | 323/280 |
| 2010/0277143 A1 | 11/2010 | Kudo et al. | |
| 2012/0049829 A1* | 3/2012 | Murakami | H02M 1/32 |
| | | | 327/333 |
| 2014/0036556 A1* | 2/2014 | Murakami | H03K 17/0822 |
| | | | 363/56.01 |
| 2015/0205314 A1* | 7/2015 | Hayashi | G05F 1/56 |
| | | | 323/217 |
| 2016/0056771 A1* | 2/2016 | Ibusuki | H03F 3/45475 |
| | | | 381/123 |
| 2016/0164409 A1* | 6/2016 | Beier | H02M 3/158 |
| | | | 323/271 |
| 2017/0070149 A1* | 3/2017 | Guan | H02M 1/36 |
| 2020/0228018 A1* | 7/2020 | Wiktor | H02M 3/156 |

FOREIGN PATENT DOCUMENTS

| | | |
|---|---|---|
| CN | 202737740 | 2/2013 |
| CN | 103219868 | 7/2013 |
| CN | 109392218 | 2/2019 |
| EP | 2081288 | 7/2009 |
| JP | 2013-005536 | 1/2013 |
| JP | 2017-041139 | 2/2017 |

* cited by examiner

POWER SUPPLY APPARATUS

BACKGROUND OF THE INVENTION

Field of the Invention

The present disclosure relates to a power supply apparatus.

Description of the Prior Art

Conventionally, DC/DC (direct current/direct current) power circuits (DC/DC converter) for converting a DC input voltage into a DC output voltage are provided in the form of LDO (low dropout, as disclosed in citation document 1), such as linear regulators (series-connection regulators) and various switch regulators.

PRIOR ART DOCUMENT

[Citation Document]
[Citation Document 1]: Japan published patent application 2017-41139

SUMMARY

[Issues Addressed]
The DC/DC power circuits include power IC (power supply apparatus). However, the odds are that the ground potential on the power IC side may not equal the ground potential on power IC load side, for reasons described below. For example, in the situation where the physical ground of a printed circuit board (PCB) on which both a power IC and a load are mounted functions as a power IC-side ground and a load-side ground, the resistance value of the physical ground causes a voltage drop when a high current flows through the physical ground. Therefore, for example, in the situation where the load-side ground potential is greater than the power IC-side ground potential, although the output voltage of the power IC attains a configured value in view of the power IC-side ground potential reference, the output voltage (power voltage) provided to the load side by the power IC is less than a configured value in view of the load-side ground potential reference.

Therefore, it is desirable for power ICs to have a deviation compensation function and a high compensation response speed. The function is effective in compensating for the deviation of the voltage at the load side from the configured value of the power voltage because of the aforementioned ground potential deviation.

To this end, it is an objective of the present disclosure to provide a power supply apparatus capable of increasing the response speed of the power voltage on a compensation load side.

[Technical Means Employed to Address the Issues]
The present disclosure provides, in an aspect thereof, a power supply apparatus (first form), for providing output voltage outputted by a DC/DC power circuit to a power supply system of a load, comprising:

an external terminal to which a load-side ground potential is applied;

an adding portion configured for adding the load-side ground potential applied to the external terminal to a set reference voltage;

a low-pass filter (LPF) including at least one resistor and at least one capacitor, wherein the LPF inputs an LPF input voltage based on an adding result of the adding portion; and an error amplifier, wherein the error amplifier is inputted an LPF output voltage from the LPF as a reference voltage and inputted a feedback voltage based on the LPF output voltage;

wherein the error amplifier is included in the DC/DC power circuit, wherein the output voltage is controlled according to an output of the error amplifier, and wherein the capacitor is connected to the load-side ground potential.

In the first form, alternatively, the adding portion includes:

a first resistor including a first end connected to the external terminal;

a second resistor including a first end and a second end, wherein the first end of the second resistor is connected to a second end of the first resistor, and a voltage based on the set reference voltage is applied to the second end of the second resistor; and a non-inverting amplifier to which an voltage is inputted, the voltage being generated at a first node connected between the first resistor and the second resistor.

The abovementioned are defined as the second form of the power supply apparatus.

In the second form, the non-inverting amplifier includes a first operating amplifier that has a first input end and a second input end being set as a first state and a second state respectively in an alternating, time-sharing and repeated manner. In the first state, a first signal is inputted to the first input end when a second signal is inputted to the second input end. In the second state, the second signal is inputted to the first input end when the first signal is inputted to the second input end. One of the positive-side output and the negative-side output of the first operating amplifier is selected according to the first state and the second state. The abovementioned are defined as the third form of the power supply apparatus.

In any one of the first through third forms, the power supply apparatus further includes a fixed amplifier disposed at a rear segment of the adding portion, and the output of the fixed amplifier is the LPF input voltage.

The fixed amplifier includes:

a second operating amplifier including a non-inverting input end to which an output of the adding portion is inputted;

a third resistor including a first end and a second end, the first end of the third resistor being connected to an output end of the second operating amplifier, and the second end of the third resistor being connected to an inverting input end of the second operating amplifier; and a fourth resistor including a first end and a second end, the first end of the fourth resistor being connected to the second end of the third resistor, and the second end of the fourth resistor being connected to the external terminal.

The abovementioned are defined as the fourth form of the power supply apparatus.

In the fourth form, the output of the adding portion and the output of the fixed amplifier are switchable and selectable to serve as the LPF input voltage.

The abovementioned is defined as the fifth form of the power supply apparatus.

In any one of the first through fifth forms, the power supply apparatus further includes a protection portion and a power-good portion.

The protection portion includes:

a fifth resistor including a first end which the feedback voltage is applied to;

a sixth resistor including a first end and a second end, the first end of the sixth resistor being connected to the second end of the fifth resistor, and the second end of the sixth resistor being connected to the external terminal;

a first comparator dedicated to OVD (overvoltage detection), wherein a voltage generated at a second node connected between the fifth resistor and the sixth resistor, and a first reference voltage generated at a first reference voltage source according to the output of the adding portion, are inputted to the first comparator; and a second comparator dedicated to UVD (undervoltage detection), wherein a voltage generated at the second node, and a second reference voltage generated at a second reference voltage source according to the output of the adding portion, are inputted to the second comparator;

wherein the power-good portion includes:

an OR circuit to which the output of the first comparator and the output of the second comparator are inputted; and an NMOS transistor including a gate driven by the output of the OR circuit.

The abovementioned are defined as the sixth form of the power supply apparatus.

The LDO (low dropout or low voltage drop regulator) functions as the DC/DC power circuit in any one of the first through sixth forms. The abovementioned is defined as the seventh form of the power supply apparatus.

The present disclosure further provides, in another aspect thereof, a power supply system including the seventh form of power supply apparatus and a load. An output voltage outputted by the LDO included in the power supply apparatus is provided to the load. Preferably, the load is, for example, an MMIC (Monolithic Microwave Integrated Circuit).

In the third form of power supply apparatus, the DC/DC power circuit is a switch regulator.

[Advantage of the Present Disclosure]

The power supply apparatus of the present disclosure is capable of increasing the response speed of the power voltage on a compensation load side.

DETAILED DESCRIPTION OF THE EMBODIMENTS

The illustrative embodiments of the present disclosure are depicted with accompanying drawings and described below.

<Power Supply System>

Figure 1:
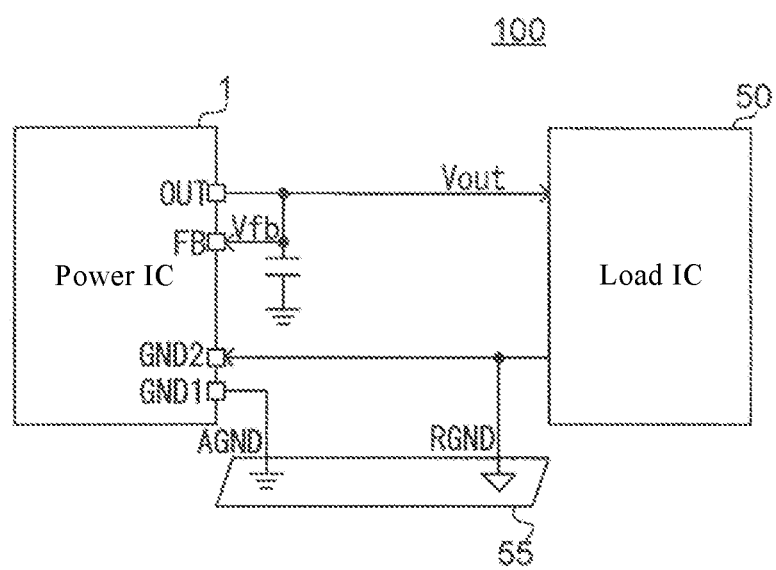
FIG. 1 is a schematic view of a power supply system according to an illustrative embodiment of the present disclosure.

FIG. 1 is a schematic view of a power supply system 100 according to an illustrative embodiment of the present disclosure. The power supply system 100 shown in FIG. 1 includes a power IC (power supply apparatus) 1 and a load IC 50. The power IC 1 provides the load IC 50 with output voltage Vout for functioning as a power voltage.

The power IC 1 is capable of effectuating LDO (low dropout) as described below. In some embodiments, the load IC 50 is, for example, an MMIC (Monolithic Microwave Integrated Circuit) applicable to RADAR (Radio Detecting and Ranging) in ADAS (Advanced Driver-Assistance systems).

When the MMIC is the load IC 50, the power IC 1 requires low noise, low voltage and high current.

The power IC 1 outputs from its OUT terminal output voltage Vout and provides output voltage Vout to the load IC 50. The output voltage Vout functions as a feedback voltage Vfb and is inputted to a FB terminal of the power IC 1. In LDO, the power IC 1 uses the feedback voltage Vfb to control the output voltage Vout, as described below.

Power IC-side ground potential AGND, which functions as ground potential at power IC 1 side, is applied to terminal GND1 of the power IC 1. The power IC-side ground potential AGND and the ground potential at the load IC 50 side (i.e., load-side ground potential RGND) use a physical ground 55 disposed in a PCB (printed circuit board) which the power IC 1 and the load IC 50 are mounted on.

Owing to ICs (for example, SOC) not shown in FIG. 1, a high current flows through the physical ground 55, including the load IC 50. Voltage drop occurs because of the resistance value of the physical ground 55. Thus, deviation between the load-side ground potential RGND and power IC-side ground potential AGND occurs. For example, in the case of a 10 mΩ resistance value of the physical ground 55, the ground potential difference of 0.1 V is generated when the current flowing through it is 10 A.

In the presence of the difference between the power IC-side ground potential AGND and load-side ground potential RGND, although the output voltage Vout provided at the power IC 1 side attains the configured value in view of the power IC-side ground potential AGND reference, the output voltage Vout provided on the load IC 50 side deviates from the configured value in view of the load-side ground potential RGND reference. For example, as mentioned above, when the load-side ground potential RGND is greater than the power IC-side ground potential AGND by 0.1 V, although the configured value has already been attained on the power IC 1 side, the output voltage Vout equals 1.0 V−0 V=1.0 V and thus has attained the configured value in view of the power IC-side ground potential AGND reference, the output voltage Vout at the load IC 50 side equals 1.0 V−0.1 V=0.9 V and is thus less than the configured value in view of the load-side ground potential RGND reference.

Therefore, the power IC 1 in this embodiment uses terminal GND2 terminal, which the load-side ground potential RGND is applied to, to sense the load-side ground potential RGND. Inside the power IC 1, the GND2 terminal is connected to a high-impedance addition amplifier (to be described later) and thus can suppress the current flowing through a wiring connected to the GND2 terminal and in the PCB (printed circuit board), so as to suppress the voltage drop of the wiring, thereby sensing the load-side ground potential RGND by the GND2 terminal.

Furthermore, in the power IC 1, the sensed load-side ground potential RGND compensates for the output voltage Vout, so as to ensure that the output voltage Vout equals the configured value in view of the load-side ground potential RGND reference. For example, in the embodiment, the power IC 1 senses the load-side ground potential RGND of 0.1 V which functions as the output voltage Vout, outputting it to the configured value of 1.0 V to add it to the load-side ground potential RGND of 0.1 V, so as to obtain 1.1 V. Thus, the output voltage Vout equals 1.1 V−0.1 V=1.0 V and thus attains the configured value in view of the load-side ground potential RGND reference. The power IC 1 is capable of performing the aforementioned long-distance sensing.

<Power IC>

Figure 2A:
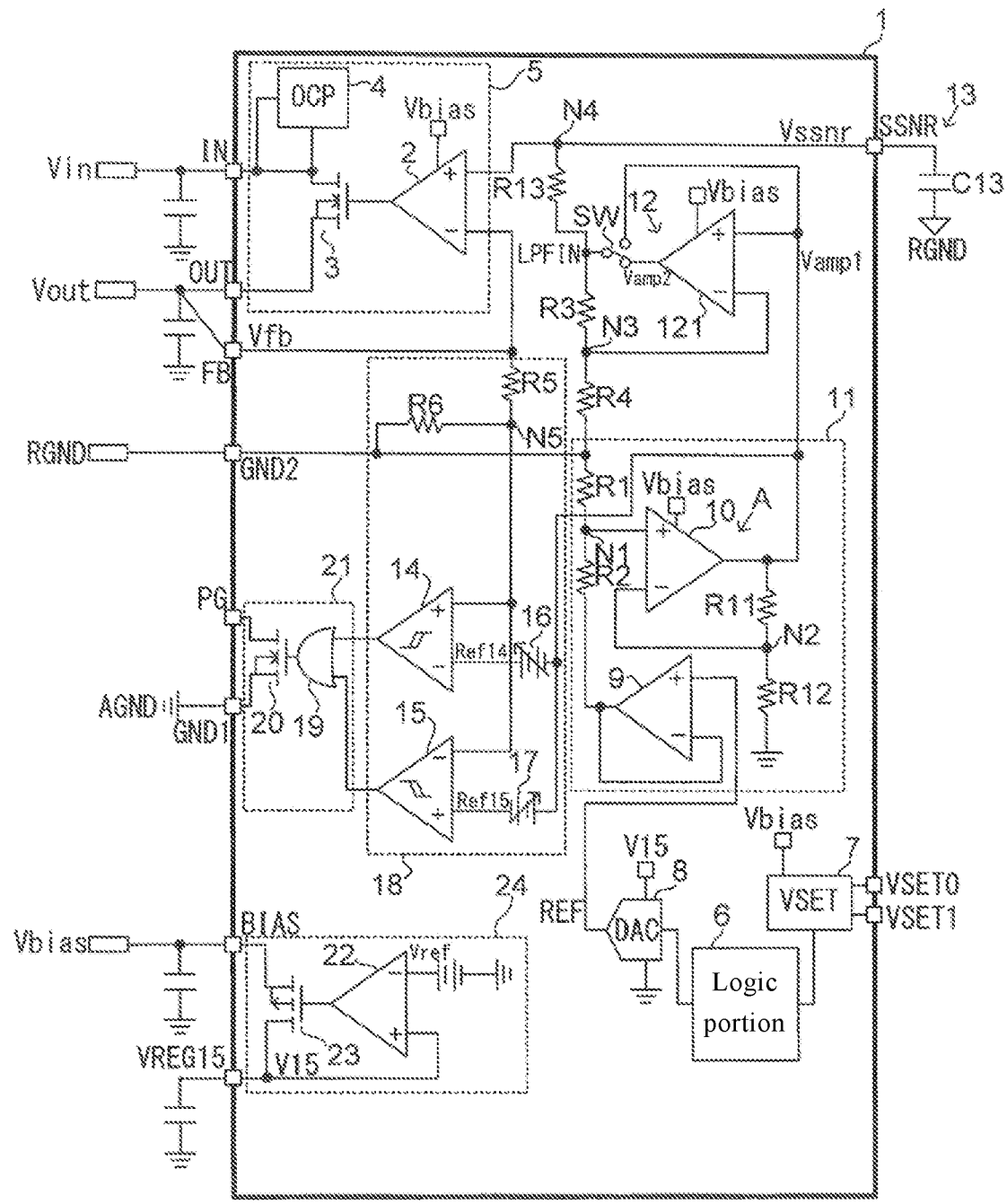
FIG. 2A is a circuit diagram of a power IC of FIG. 1.

FIG. 2A is a circuit diagram of the power IC 1 of FIG. 1. The power IC 1 shown in FIG. 2A is a semiconductor device, wherein LDO5, logic portion 6, voltage configured portion 7, DAC (D/A converter) 8, addition amplifier 11, fixed amplifier 12, resistor R13 dedicated to LPF (low-pass filter) 13, protection portion 18, power-good portion 21, and internal voltage generating portion 24 are integrated on one chip.

Furthermore, in the power IC 1, external terminals for use in externally creating electrical connections include IN terminal, OUT terminal, FB terminal, PG terminal, GND1 terminal, GND2 terminal, BIAS terminal, VREG15 terminal, SSNR terminal, VSET0 terminal, and VSET1 terminal.

LDO5 is a linear regulator for reducing the input voltage Vin applied to IN terminal, and outputting the output voltage Vout from OUT terminal. For example, when the input voltage Vin=1.3 V, the output voltage Vout is around 1 V.

LDO5 includes an error amplifier 2, NMOS transistor 3, and OCP (overcurrent protection) portion 4. LPF output voltage Vssnr outputted by LPF 13 (to be described later) is inputted to the non-inverting input end (+) of the error amplifier 2. The feedback voltage Vfb applied to FB terminal is inputted to the inverting input end (−) of the error amplifier 2. The output end of the error amplifier 2 is connected to the gate of the NMOS transistor 3. The drain of the NMOS transistor 3 is connected to IN terminal to which the input voltage Vin is externally applied. The source of the NMOS transistor 3 is connected to OUT terminal.

The output voltage Vout functions as the feedback voltage Vfb and is inputted to the error amplifier 2. The error amplifier 2 drives the gate of the NMOS transistor 3 to ensure that the feedback voltage Vfb equals the LPF output voltage Vssnr functioning as a reference voltage. Thus, LDO5 ensures that the output voltage Vout outputted by OUT terminal equals LPF output voltage Vssnr. The method of generating LPF output voltage Vssnr functioning as the reference voltage is described below.

The internal voltage generating portion 24 is a circuit for reducing bias voltage Vbias externally applied to BIAS terminal and thereby generating internal voltage V15.

The internal voltage generating portion 24 includes error amplifier 22 and PMOS transistor 23. The reference voltage Vref generated according to a band gap reference is applied to the inverting input end (−) of the error amplifier 22. The non-inverting input end (+) of the error amplifier 22 is connected to VREG15 terminal. The gate of the PMOS transistor 23 is connected to the output end of the error amplifier 22. The source of the PMOS transistor 23 is connected to BIAS terminal. The drain of the PMOS transistor 23 is connected to VREG15 terminal.

The error amplifier 22 drives the gate of the PMOS transistor 23, such that the terminal voltage (i.e., internal voltage V15) of VREG15 terminal equals the reference voltage Vref. For example, if bias voltage Vbias=5 V, and reference voltage Vref=1.5 V, then internal voltage V15 of 1.5 V will be generated.

The power voltage of the error amplifier 2 included in the LDO5 is the bias voltage Vbias so as to drive the gate of the NMOS transistor 3.

The voltage configured portion 7 is a circuit for configuring a voltage value of a configured reference voltage REF (to be described later) according to a combination of voltages applied to VSET0 terminal and VSET1 terminal. For example, when any one of ground potential, internal voltage V15, or bias voltage Vbias is applied to VSET0 terminal and VSET1 terminal, nine (3×3=9) configurable voltage values may be present.

The logic portion 6 outputs to DAC 8 a numeric command signal corresponding to a command of the voltage configured portion 7. DAC 8 performs D/A conversion on the numeric command signal thus inputted and outputs configured reference voltage REF which functions as a simulation signal. DAC 8 uses internal voltage V15 as power voltage and outputs the voltage between the ground potential (power IC-side ground potential AGND) and internal voltage V15. The configured reference voltage REF is inputted to the addition amplifier 11.

The addition amplifier 11 includes a buffer 9, operating amplifier 10, voltage divider resistors R1, R2, and resistors R11, R12. The configured reference voltage REF is applied to one end of voltage divider resistor R2 via the buffer 9. The other end of voltage divider resistor R2 is connected to one end of voltage divider resistor R1 via node N1. The other end of voltage divider resistor R1 is connected to GND2 terminal. As mentioned before, the load-side ground potential RGND (FIG. 1) is applied to GND2 terminal.

The node N1 is connected to the non-inverting input end (+) of the operating amplifier 10. The output end of the operating amplifier 10 is connected to one end of resistor R11. The other end of resistor R11 is connected to one end of resistor R12 via node N2. The ground potential (power IC-side ground potential AGND) is applied to the other end of resistor R12. The node N2 is connected to the inverting input end (−) of the operating amplifier 10.

The operating amplifier 10 and resistors R11, R12 together form non-inverting amplifier A. If resistors R11 and R12 have the same resistance value (for example, 100 kΩ), the amplification ratio of the non-inverting amplifier A is 2. If voltage divider resistors R1 and R2 also have the same resistance value (for example, 100 kΩ) and the output of the operating amplifier 10 (addition amplifier 11) is set to the first amplifier output voltage Vamp1, equation (1) below is established.

$$((REF-RGND)/2+RGND)\times 2 = Vamp1 \quad (1)$$

Equation (2) below is derived from equation (1).

$$Vamp1 = REF + RGND \quad (2)$$

Thus, the addition amplifier 11 adds the sensed load-side ground potential RGND to the configured reference voltage REF.

The first amplifier output voltage Vamp1 is inputted to the fixed amplifier 12 and inputted to switch SW. The fixed amplifier 12 includes an operating amplifier 121 and resistors R3, R4. The first amplifier output voltage Vamp1 is inputted into the non-inverting input end (+) of the operating amplifier 121. The output end of the operating amplifier 12 is connected to one end of resistor R3 via the switch SW. The other end of resistor R3 is connected to one end of resistor R4 via node N3. The other end of resistor R4 is connected to GND2 terminal which the load-side ground potential RGND is applied to. The node N3 is connected to the inverting input end (−) of the operating amplifier 121.

The operating amplifier 121 and resistors R3, R4 together form the fixed amplifier 12 of the non-inverting amplifier. In this regard, owing to a virtual short of the operating amplifier 121, the voltage at node N3 is equal to Vamp1.

In the situation where the switch SW selects the output side of the operating amplifier 121, if the output of the operating amplifier 121 is set to the second amplifier output voltage Vamp2, equation (3) below is established.

$$((Vamp2-Vamp1)/R3) \times R4+RGND=Vamp1 \qquad (3)$$

Equation (2) is substituted into equation (3). The resistance value ratio of resistors R3, R4 is as follows: R3:R4=1.5:1.0, thereby resulting in equation (4) below. Thus, the fixed amplifier 12 has a constant amplification ratio of 2.5.

$$Vamp2=2.5 \times REF+RGND \qquad (4)$$

Thus, when the switch SW selects the operating amplifier 121 (fixed amplifier 12) side (the first selected state), LPF input voltage LPFIN of the input of LPF 13 is equal to Vamp2. On the other hand, when the switch SW selects the Vamp1 side (the second selected state), LPFIN=Vamp1.

In the second selected state, the configured reference voltage REF is configured to be equal to the configured value of the output voltage Vout of the load-side ground potential RGND reference. For example, when the configured value=1.0 V, the configured REF=1.0 V.

In the first selected state, the configured reference voltage REF is configured to be equal to 1/2.5 of the configured value. For example, when the configured value=3.0 V, the configured REF=1.2V. Furthermore, the maximum value of the configured value is, for example, set to 3.3 V, and the configured reference voltage REF does not exceed the internal voltage V15=1.5 V. Moreover, if the configured value needs to be greater than 3.3 V, the amplification ratio of the fixed amplifier 12 will be set to be greater than 2.5.

LPF input voltage LPFIN is inputted to LPF 13. LPF 13 includes capacitor C13 and resistor R13. LPF input voltage LPFIN is inputted to one end of resistor R13. The other end of resistor R13 is connected to SSNR terminal via node N4. SSNR terminal is connected to one end of capacitor C13. The load-side ground potential RGND is applied to the other end of capacitor C13.

Referring to FIG. 2A, capacitor C13 is disposed outside power IC 1. However, capacitor C13 may be disposed inside power IC 1 in order to increase capacitance.

LPF input voltage LPFIN is filtered with LPF 13, and thus LPF output voltage Vssnr is generated at SSNR terminal (node N4). With LPF 13 being disposed at the rear segment of the addition amplifier 11, noise generated by the addition amplifier 11 is eliminated.

As mentioned before, the LPF output voltage Vssnr outputted by LPF 13 functions as the reference voltage applied to the error amplifier 2 of LDO 5. Therefore, the output voltage Vout is controlled to be equal to the LPF output voltage Vssnr.

In this embodiment, even if deviation happens to the load-side ground potential RGND and power IC-side ground potential AGND, the output voltage Vout can be compensated for in view of the load-side ground potential RGND reference to enable it to be equal to the configured value by sensing the load-side ground potential RGND with power IC 1 and by adding the sensed load-side ground potential RGND to the configured reference voltage REF with the addition amplifier 11.

For example, in the aforementioned situation of the configured reference voltage REF=1.0 V, when the power IC-side ground potential AGND=0 V, and the load-side ground potential RGND=0.1 V, if it is the second selected state, the addition amplifier 11 provides Vamp1=1.0+0.1=1.1 V, LPFIN=Vamp1, and controls the output voltage Vout=1.1 V. Thus, under the load-side ground potential RGND reference, the output voltage Vout=1.1−0.1=1.0 V, and is equal to the configured value.

For example, in the aforementioned situation of the configured reference voltage REF=1.2V, when the power IC-side ground potential AGND=0 V, and the load-side ground potential RGND=0.1 V, if it is the first selected state, the addition amplifier 11 and fixed amplifier 12 provide Vamp2=2.5×1.2+0.1=3.1 V, LPFIN=Vamp2, and control output voltage Vout=3.1 V. Thus, under the load-side ground potential RGND reference, the output voltage Vout=3.1−0.1=3.0 V, and is equal to the configured value.

The fixed amplifier 12 and switch SW are optional. When they are absent, the output of the addition amplifier 11 directly becomes LPF input voltage LPFIN.

<Problems With Application of LPF to Addition Amplifier>

If the LPF is disposed at the front segment of the addition amplifier, noise generated by the addition amplifier cannot be eliminated. Therefore, the LPF must be disposed at the rear segment of the addition amplifier as disclosed in this embodiment. However, if the ground potential of the capacitor C13 connected to LPF 13, for example, is only set to be the power IC-side ground potential AGND, problems will occur, as described below.

When the load-side ground potential RGND changes, the response speed of the addition amplifier 11 is high, and thus the addition amplifier 11 can quickly perform the addition of the load-side ground potential RGND. Consequently, changes in the load-side ground potential RGND are quickly manifested in the LPF input voltage LPFIN. However, if capacitor C13 is connected to power IC-side ground potential AGND, capacitor C13 must be recharged to enable the LPF output voltage Vssnr to be equal to the LPF input voltage LPFIN. Thus, the response speed of the LPF output voltage Vssnr decreases, and during the recharging time period, the output voltage Vout deviates from the configured value in view of the load-side ground potential RGND reference.

Therefore, in this embodiment, as shown in FIG. 2A, capacitor C13 is connected to the load-side ground potential RGND. Thus, when the LPF input voltage LPFIN varies with the load-side ground potential RGND, the load-side ground potential RGND connected to capacitor C13 varies. Therefore, it is good enough to maintain only the voltage between two ends of capacitor C13. Thus, capacitor C13 needs not to be recharged, and the response speed of LPF output voltage Vssnr increases. Therefore, subject to the load-side ground potential RGND reference, the output voltage Vout is controlled, in real time, to be equal to the configured value.

Figure 3:
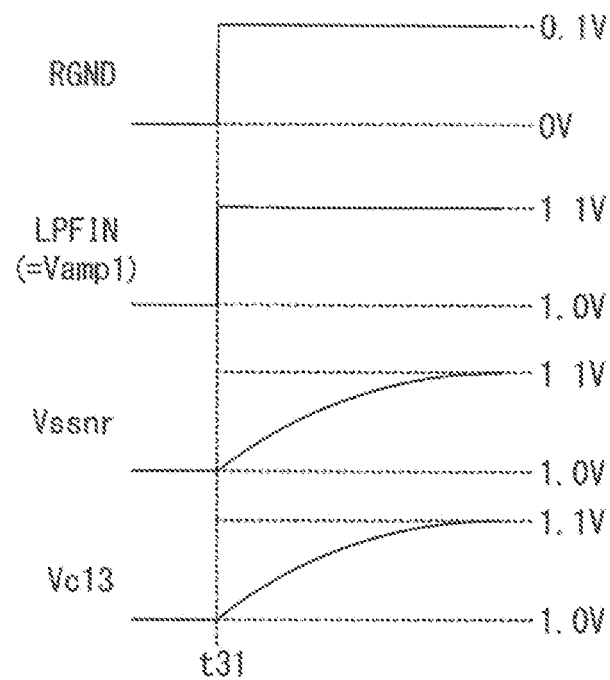
FIG. 3 is a time sequence diagram of different waveforms in a comparative embodiment.
Figure 4:
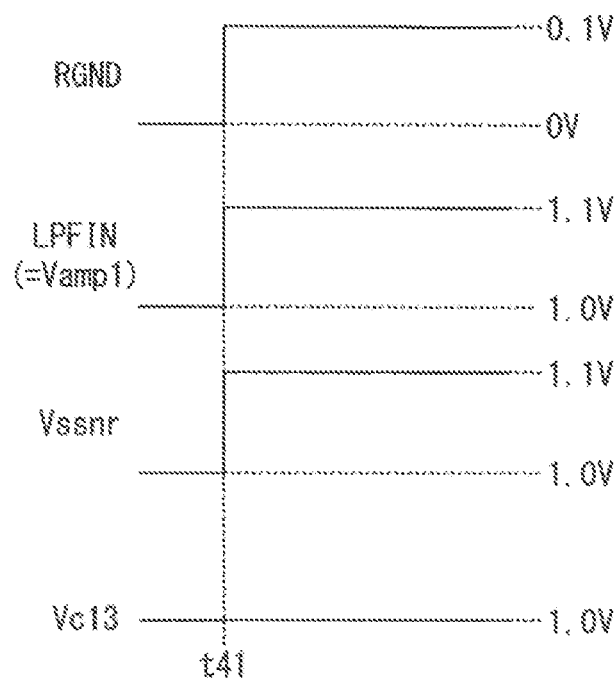
FIG. 4 is a time sequence diagram of different waveforms in the illustrative embodiment.

The problem is illustrated, on exemplary basis, with the time sequence diagrams of FIG. 3 and FIG. 4, wherein the switch SW selects the second selected state, and the configured reference voltage REF=1.0 V.

FIG. 3 shows waveforms wherein capacitor C13 is connected to the power IC-side ground potential AGND (comparative embodiment). FIG. 3 and FIG. 4 show the load-side ground potential RGND, LPF input voltage LPFIN, LPF output voltage Vssnr, and voltage Vc13 between two ends of capacitor C13 in the order from top to bottom.

As shown in FIG. 3, at time sequence t31, when the load-side ground potential RGND changes stepwise from 0 V to 0.1 V, LPF input voltage LPFIN (=Vamp1) passes through the addition amplifier 11 and thus changes stepwise from 1.0 V to 1.1 V. However, when the power IC-side ground potential AGND is connected to the capacitor C13 being recharged, not only must the LPF output voltage Vssnr, but voltage Vc13 between two ends of capacitor C13 also changes from 1.0 V to 1.1 V. Therefore, as shown in FIG. 3, not only does the response speed of the LPF output voltage Vssnr decrease, but the output voltage Vout also deviates from the configured value 1.0 V in view of the load-side ground potential RGND reference before the LPF output voltage Vssnr attains the required 1.1 V.

FIG. 4 shows waveforms wherein capacitor C13 is connected to the load-side ground potential RGND in this embodiment. Like FIG. 3, FIG. 4 shows that, at time sequence t41, when the load-side ground potential RGND changes stepwise from 0 V to 0.1 V, LPF input voltage LPFIN (=Vamp1) passes through the addition amplifier 11 and thus changes stepwise from 1.0 V to 1.1 V. In this embodiment, since the load-side ground potential RGND connected to capacitor C13 changes stepwise from 0 V to 0.1 V, not only is the voltage Vc13 between two ends of capacitor C13 maintained at 1.0 V, but LPF output voltage Vssnr also changes stepwise from 1.0 V to 1.1 V, as shown in FIG. 4. Thus, capacitor C13 need not be recharged, and the response speed of LPF output voltage Vssnr increases. Thus, the output voltage Vout controls, in real time, the configured value to be equal to 1.0 V in view of the load-side ground potential RGND reference.

Therefore, the power supply apparatus in this embodiment not only generates low noise while performing the long-distance sensing of the load-side ground potential RGND but also greatly improves the response of the output voltage Vout to changes in the load-side ground potential RGND in view of the load-side ground potential RGND reference.

<Power-Good Portion>

Referring to FIG. 2A, the protection portion 18 includes a comparator 14, comparator 15, variable reference voltage sources 16, 17, and voltage divider resistors R5, R6.

One end of voltage divider resistor R5 is connected to FB terminal. The other end of voltage divider resistor R5 is connected to one end of resistor R6 via node N5. The other end of resistor R6 is connected to GND2 terminal. Thus, the voltage generated at node N5 results from the division of voltage between the feedback voltage Vfb and the load-side ground potential RGND through the voltage divider resistors R5, R6. The node N5 is not only connected to the OVD-oriented (overvoltage detection-oriented) non-inverting input end (+) of the comparator 14 but also connected to the UVD-oriented (undervoltage detection-oriented) inverting input end (−) of the comparator 15.

Reference voltage Ref14 generated by the variable reference voltage source 16 using Vamp1 as reference is applied to the inverting input end (−) of the comparator 14. The reference voltage Ref14 is a voltage higher than Vamp1. Reference voltage Ref15 generated by the variable reference voltage source 17 using Vamp1 as reference is applied to the non-inverting input end (+) of the comparator 15. The reference voltage Ref15 is a voltage lower than Vamp1.

The power-good portion 21 includes an OR circuit 19 and NMOS transistor 20. The output of the comparator 14 and the output of the comparator 15 are inputted to the OR circuit 19. The output of the OR circuit 19 is applied to the gate of the NMOS transistor 20. The source of the NMOS transistor 20 is connected to GND1 terminal. The power IC-side ground potential AGND is applied to the GND1 terminal. The drain of the NMOS transistor 20 is connected to PG terminal.

As a result, when comparator 14 detects overvoltage of output voltage Vout under the load-side ground potential RGND reference, or when comparator 15 detects undervoltage of output voltage Vout under the load-side ground potential RGND reference, the output of OR circuit 19 is at high level, NMOS transistor 20 enters the ON state, and the terminal voltage of PG terminal becomes ground potential (power IC-side ground potential AGND). In this situation, the terminal voltage of PG terminal enters an abnormal state.

As mentioned before, in the situation where the power IC-side ground potential AGND is connected to capacitor C13, owing to a response delay of the output voltage Vout in view of the load-side ground potential RGND reference, the comparator 15 can detect undervoltage, and thus the terminal voltage of the PG terminal manifests an abnormal state. Likewise, in this embodiment, when capacitor C13 connects to the load-side ground potential RGND, the response of the output voltage Vout speeds up in view of the load-side ground potential RGND reference, so as to prevent the terminal voltage of the PG terminal from manifesting an abnormal state.

<Variant Embodiment of Power IC>

The voltage divider resistor R2 and voltage divider resistor R1 effectuate resistor-based voltage division. The resistance value of the voltage divider resistor R2 is an important parameter. When the DAC 8 is formed by R2R ladder, the output impedance of the DAC 8 is of a constant value and thus does not depend on its output voltage value. The constant value is set to the resistance value of voltage divider resistor R2 in order to dispense with the buffer 9.

Figure 2B:
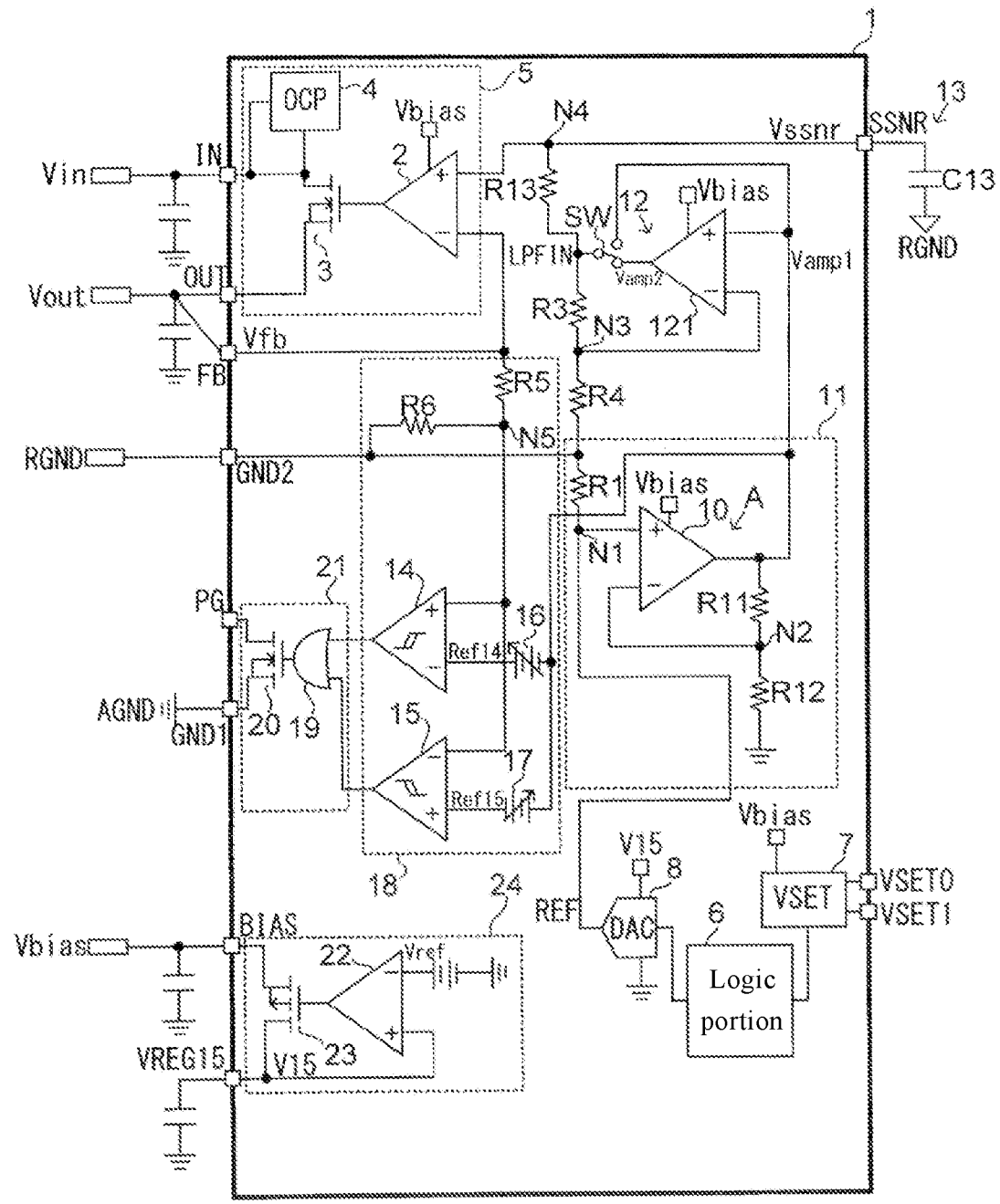
FIG. 2B is a circuit diagram of the power IC in a variant embodiment.

Therefore, the inside of power IC 1 can dispense with the buffer 9 (as is the case in FIG. 2B). Regarding power IC 1 shown in FIG. 2B, the output end of DAC 8 is connected to the non-inverting input end (+) of the operating amplifier 10. Since the buffer 9 is dispensed with, power IC 1 is conducive to reduction of circuit area, circuit current, and shift error.

<Application of Switch Regulator>

Figure 5:
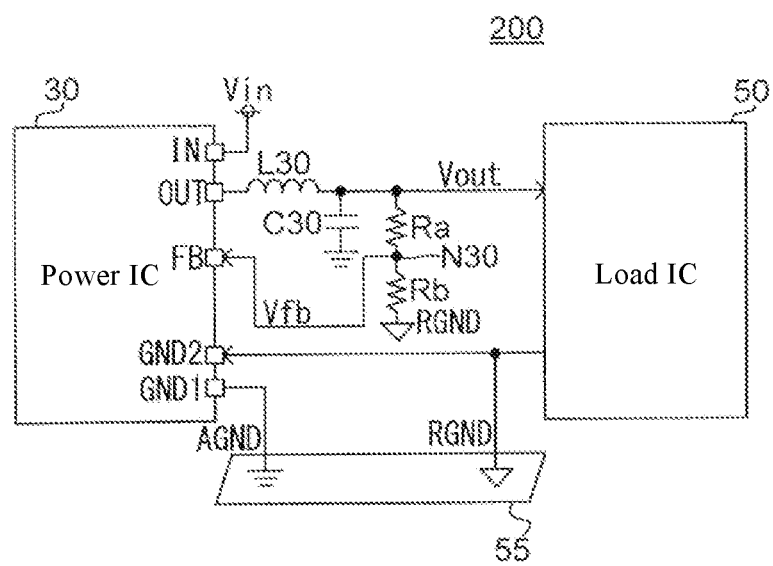
FIG. 5 is a schematic view of the power supply system according to another illustrative embodiment of the present disclosure.

The application of the power IC in the embodiments of the present disclosure is not restricted to linear regulators but includes switch regulators. FIG. 5 is a schematic view of a power supply system 200 in which the power IC is applicable to a switch regulator.

FIG. 5 is illustrative of power IC 30 applicable to a buck switch regulator (DC/DC converter). The power IC 30 has OUT terminal. The OUT terminal is externally connected to one end of an inductor L30. The other end of the inductor L30 is connected to one end of the output capacitor C30. The power IC 30 switches between transistors (not shown) disposed therein to thereby reduce the input voltage Vin applied to IN terminal and generate the output voltage Vout at one end of the output capacitor C30. The output voltage Vout thus generated is supplied to load IC 50.

The load IC 50 is, for example, SOC (System On Chip) designed and adapted for microcomputer functions and application functions to be integrated into a chip and thereby coordinated to provide products with systematic functions.

Referring to FIG. 5, feedback voltage Vfb, which is generated by performing voltage division on the output voltage Vout with voltage divider resistors Ra, Rb, is applied to FB terminal of power IC 30. One end of the output capacitor C30 for generating the output voltage Vout is connected to one end of voltage divider resistor Ra. The other end of voltage divider resistor Ra is connected to one end of voltage divider resistor Rb via node N30. The other end of voltage divider resistor Rb is connected to the load-side ground potential RGND. The feedback voltage Vfb is generated at node N30. Furthermore, voltage divider resistors Ra, Rb are not necessarily externally connected to the power IC 30 shown in FIG. 5; instead, they may be disposed in the power IC 30 shown in FIG. 5. In the power IC 30, the feedback voltage Vfb is, for example, used to perform PWM control and control the output voltage Vout.

Furthermore, like FIG. 1, FIG. 5 shows that the power IC-side ground potential AGND is applied to GND1 terminal of power IC 30. Furthermore, like FIG. 1, FIG. 5 shows that, power IC 30 includes GND2 terminal to which the load-side ground potential RGND is applied, in order to sense the load-side ground potential RGND. Moreover, like FIG. 1, FIG. 5 shows the physical ground 55.

Like what is disclosed in the aforementioned embodiment, power IC 30 is capable of performing long-distance sensing of the load-side ground potential RGND. Therefore, even if the load-side ground potential RGND deviates from the power IC-side ground potential AGND, it will still be feasible to compensate for the output voltage Vout, controlling the output voltage Vout to be equal to the configured value in view of the load-side ground potential RGND reference.

Figure 6:
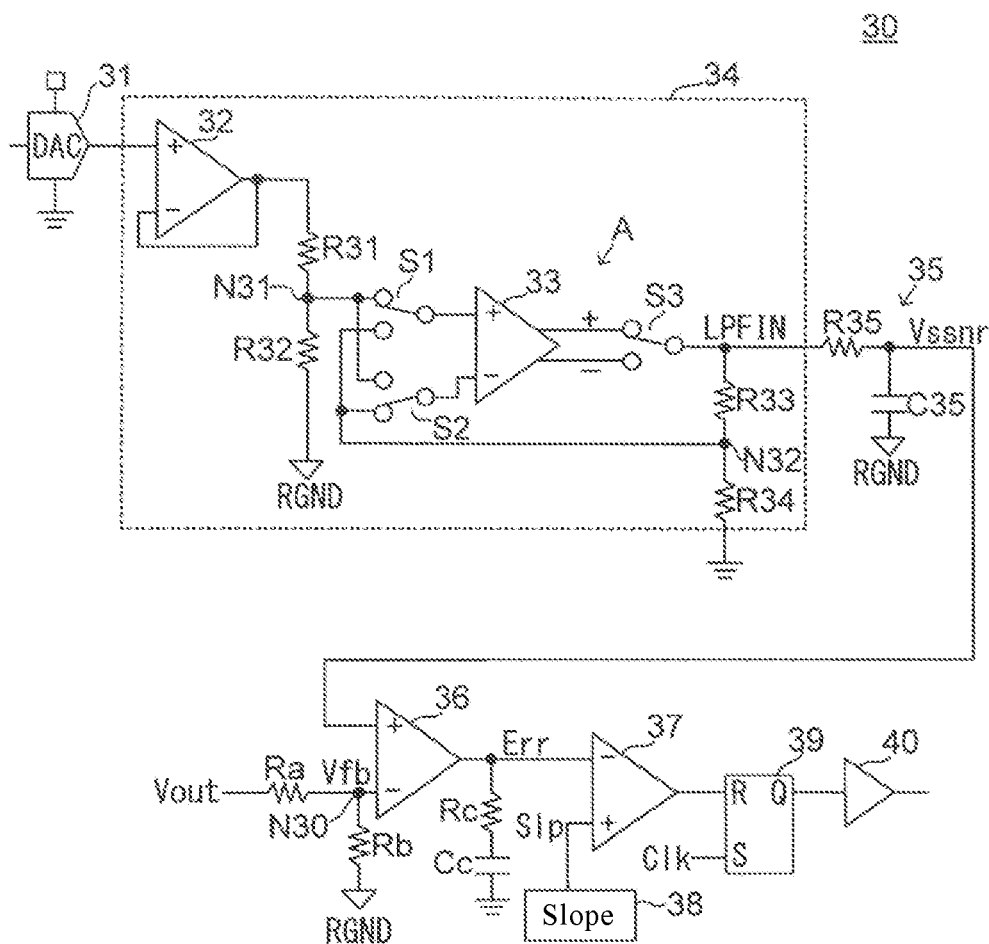
FIG. 6 is a schematic circuit diagram of the power IC of FIG. 5.

FIG. 6 is a schematic circuit diagram of power IC 30. As shown in FIG. 6, the power IC 30 includes DAC 31, addition amplifier 34, error amplifier 36, PWM comparator 37, slope generating portion 38, trigger 39, and driver 40. The LPF 35 includes a resistor R35 and a capacitor C35. The capacitor C35 is externally connected to the power IC 30 or disposed in the power IC 30. The power IC 30 at least includes resistor R35 and capacitor C35.

FIG. 6 further shows voltage divider resistors Ra, Rb, resistor Rc, and capacitor Cc, which are externally connected to the power IC 30.

The DAC 31, addition amplifier 34, and LPF 35 together generate LPF output voltage Vssnr which functions as a reference voltage inputted to the error amplifier 36, in the manner as the DAC 8, addition amplifier 11, and LPF 13 shown in FIG. 2A. Therefore, they are not described in detail hereunder, but their essential technical features are described hereunder.

The addition amplifier 34 includes a buffer 32, voltage divider resistors R31, R32, switches S1~S3, operating amplifier 33, and resistors R33, R34. The output end of the buffer 32 is connected to one end of resistor R31. The other end of resistor R31 is connected to one end of resistor R32 via node N31. The other end of resistor R32 is connected to GND2 terminal (FIG. 5). Thus, the load-side ground potential RGND is applied to the other end of resistor R32.

The switch S1 selects any one of the voltage (the first signal) at node N31 and the voltage (the second signal) at node N32 connected between resistors R33, R34 and inputs the selected voltage to the non-inverting input end (+) of the operating amplifier 33. The switch S2 selects any one of the voltage at node N31 and the voltage at node N32 and inputs the selected voltage to the inverting input end (−) of the operating amplifier 33. The switch S3 selects and outputs any one of positive-side output (+) and negative-side output (−) of the operating amplifier 33. The selected output is applied to one end of resistor R33.

When the switch S1 selects the voltage at node N31, the switch S2 selects the voltage (the first selection) at node N32. When the switch S1 selects the voltage at node N32, the switch S2 selects the voltage (the second selection) at node N31. The switch S3 switches between the positive-side output and negative-side output according to the two selections. For example, the positive-side output is selected in the case of the first selection, and the negative-side output is selected in the case of the second selection.

Therefore, it is feasible to switch between the positive-side output and negative-side output according to the first selection and the second selection in a time-sharing and alternating manner. Thus, the output of the switch S3 generates the shift of the operating amplifier 33 by positive-negative alternation. However, on average, the shift is substantially 0. Thus, the addition amplifier 34 is capable of eliminating the shift automatically.

To eliminate ripple arising from the positive-negative alternation of the shift, the LPF 35 is disposed at the rear segment of the addition amplifier 34. If the ripple is, for example, 1 MHz, the cutoff frequency for the LPF 35 is less than 1 MHz. Thus, the output of the switch S3 is used as LPF input voltage LPFIN and inputted to the LPF 35.

The switch regulator has so much noise that LPF is seldom required. However, in this embodiment, an LPF is required in order to eliminate the ripple generated as a result of the aforementioned automatic elimination of shift, thereby leading to the same problem as confronted by the embodiment illustrated by FIG. 2A, that is, the problem with the long-distance sensing function provided by the combination of the addition amplifier and LPF. Therefore, in this embodiment, the load-side ground potential RGND, rather than the power IC-side ground potential AGND, is connected to the capacitor C35 of LPF 35.

Likewise, in the situation where the load-side ground potential RGND changes abruptly, even though LPF input voltage LPFIN changes abruptly because of the addition amplifier 34, capacitor C35 need not be recharged, thereby increasing the response speed of LPF output voltage Vssnr.

The LPF output voltage Vssnr thus generated is inputted to the non-inverting input end (+) of the error amplifier 36. The feedback voltage Vfb is inputted to the inverting input end (−) of the error amplifier 36. The output of the error amplifier 36 functions as an error signal Err and is thus inputted to the inverting input end (−) of PWM comparator 37. The resistor Rc and capacitor Cc are connected to the output end of the error amplifier 36 to compensate for phases.

A slope signal Slp, which has a serrate waveform and is generated by the slope generating portion 38, is inputted to the non-inverting input end (+) of the PWM comparator 37. The output of the PWM comparator 37 is inputted to the reset terminal of the trigger 39. A clock signal Clk is inputted to the setting terminal of the trigger 39. The output of the Q terminal of the trigger 39 is inputted to the driver 40.

Given Clk-based specification of frequency and determination of a duty cycle through comparison of the slope signal Slp and error signal Err, PWM control can be carried out. The driver 40 performs switch driving on switching-oriented transistors (not shown).

For example, in case of a non-synchronous rectification DC/DC converter, switch driving is performed on a transistor between OUT terminal and IN terminal which the input voltage Vin (FIG. 5) is applied to. A diode is disposed between OUT terminal and ground potential.

Furthermore, for example, in case of a synchronous rectification DC/DC converter, switch driving is performed on a high-side transistor between OUT terminal and IN terminal which the input voltage Vin (FIG. 5) is applied to and on a low-side transistor disposed between OUT terminal and ground potential.

PWM control is carried out to exercise switch control to cause the feedback voltage Vfb to equal the LPF output voltage Vssnr functioning as a reference voltage and control the output voltage Vout. As mentioned before, LPF output voltage Vssnr equals REF+RGND as described above, thereby controlling Vfb=REF+RGND. Therefore, $$Vout=(REF+RGND-RGND)/Rb \times (Ra+Rb)+ RGND=REF \times (Ra+Rb)/Rb+RGND$$

Therefore, subject to the load-side ground potential RGND reference, Vout=REF×(Ra+Rb)/Rb, Vout can be controllably set to a configured value not dependent on RGND.

<Others>

Embodiments of the present disclosure are described above. However, various changes can be made to the embodiments without departing from the scope of the spirit of the present disclosure.

For example, the switch regulator using the power IC is not restricted to buck type but may also be boost type or buck-boost type, and it is not restricted to non-insulating type but may also be insulating type.

INDUSTRIAL APPLICABILITY

The present disclosure is applicable to various DC/DC converters.

What is claimed is:

1. A power supply apparatus, for providing an output voltage outputted by a DC/DC power circuit to a power supply system of a load, comprising:
    an external terminal to which a load-side ground potential is applied;
    an adding portion configured for adding the load-side ground potential applied to the external terminal to a set reference voltage;
    an LPF (Low-Pass Filter) including at least one resistor and at least one capacitor, wherein the LPF inputs an LPF input voltage based on an adding result of the adding portion; and
    an error amplifier, wherein the error amplifier is inputted an LPF output voltage from the LPF as a reference voltage and inputted a feedback voltage based on the LPF output voltage;
    wherein the error amplifier is included in the DC/DC power circuit,
    wherein the output voltage is controlled according to an output of the error amplifier, and
    wherein the capacitor is connected to the load-side ground potential.

2. The power supply apparatus of claim 1, wherein the adding portion comprises:
    a first resistor including a first end connected to the external terminal;
    a second resistor including a first end and a second end, wherein the first end of the second resistor is connected to a second end of the first resistor, and a voltage based on the set reference voltage is applied to the second end of the second resistor; and
    a non-inverting amplifier to which an voltage is inputted, the voltage being generated at a first node connected between the first resistor and the second resistor.

3. The power supply apparatus of claim 2, wherein the non-inverting amplifier includes a first operating amplifier that has a first input end and a second input end being set as a first state and a second state respectively in an alternating, time-sharing and repeated manner,
    wherein in the first state, a first signal is inputted to the first input end when a second signal is inputted to the second input end,
    wherein in the second state, the second signal is inputted to the first input end when the first signal is inputted to the second input end,
    wherein one of the positive-side output and the negative-side output of the first operating amplifier is selected according to the first state and the second state.

4. The power supply apparatus of claim 3, wherein the DC/DC power circuit is a switch regulator.

5. The power supply apparatus of claim 1, further comprising a fixed amplifier disposed at a rear segment of the adding portion, wherein an output of the fixed amplifier is the LPF input voltage, and wherein the fixed amplifier comprises:
    a second operating amplifier including a non-inverting input end to which an output of the adding portion is inputted;
    a third resistor including a first end and a second end, the first end of the third resistor being connected to an output end of the second operating amplifier, and the second end of the third resistor being connected to an inverting input end of the second operating amplifier; and
    a fourth resistor including a first end and a second end, the first end of the fourth resistor being connected to the second end of the third resistor, and the second end of the fourth resistor being connected to the external terminal.

6. The power supply apparatus of claim 5, wherein the output of the adding portion and the output of the fixed amplifier are switchable and selectable to serve as the LPF input voltage.

7. The power supply apparatus of claim 1, further comprising a protection portion and a power-good portion,
    wherein the protection portion comprises:
    a fifth resistor including a first end which the feedback voltage is applied to;
    a sixth resistor including a first end and a second end, the first end of the sixth resistor being connected to the second end of the fifth resistor, and the second end of the sixth resistor being connected to the external terminal;
    a first comparator dedicated to OVD (Overvoltage Detection), wherein a voltage generated at a second node connected between the fifth resistor and the sixth resistor, and a first reference voltage generated at a first reference voltage source according to the output of the adding portion, are inputted to the first comparator; and
    a second comparator dedicated to UVD (Undervoltage Detection), wherein a voltage generated at the second node, and a second reference voltage generated at a second reference voltage source according to the output of the adding portion, are inputted to the second comparator;
    wherein the power-good portion comprises:
    an OR circuit to which the output of the first comparator and the output of the second comparator are inputted; and
    an NMOS transistor including a gate driven by the output of the OR circuit.

8. The power supply apparatus of claim 1, further comprising LDO (Low Dropout) functioning as the DC/DC power circuit.

9. A power supply system comprising: the power supply apparatus of claim 8; and a load being supplied with an output voltage outputted by LDO included in the power supply apparatus.

10. The power supply system of claim 9, wherein the load is MMIC (Monolithic Microwave Integrated Circuit).

* * * * *